United States Patent [19]

De Salvo

[11] Patent Number: 5,509,631
[45] Date of Patent: Apr. 23, 1996

[54] THREE AXIS MOTION PLATFORM

[75] Inventor: Thomas De Salvo, Ellicott City, Md.

[73] Assignee: Ridefilm Corporation, South Lee, Mass.

[21] Appl. No.: 130,507

[22] Filed: Oct. 1, 1993

[51] Int. Cl.⁶ .................................................. A47G 29/00
[52] U.S. Cl. .......................... 248/370; 248/371; 248/429; 434/55; 472/59
[58] Field of Search ...................... 248/176, 178, 248/183, 184, 913, 370, 371, 424, 429; 297/344.16, 344.17; 182/131, 141, 148; 434/55, 29; 472/59, 60, 61

[56] References Cited

U.S. PATENT DOCUMENTS

| | | | |
|---|---|---|---|
| 838,137 | 12/1906 | Plummer | 472/60 |
| 1,789,680 | 1/1931 | Gwinnett | 472/60 |
| 3,233,508 | 2/1966 | Hemstreet . | |
| 3,542,934 | 11/1970 | Worhurst et al. | 434/29 |
| 3,577,655 | 5/1971 | Pancoe . | |
| 3,577,659 | 5/1971 | Kail . | |
| 3,645,011 | 2/1972 | Callanen . | |
| 3,865,430 | 2/1975 | Tanus . | |
| 3,923,300 | 12/1975 | Tanus . | |
| 4,066,256 | 1/1978 | Trumbull . | |
| 4,113,223 | 9/1978 | Kakizaki | 248/184 X |
| 4,276,030 | 6/1981 | Radice . | |
| 4,343,610 | 8/1982 | Chou . | |
| 4,478,407 | 10/1984 | Manabe . | |
| 4,492,356 | 1/1985 | Toniguchi et al. | 248/178 X |
| 4,576,577 | 3/1986 | Lam et al. . | |
| 4,641,255 | 2/1987 | Hohmann . | |
| 4,710,129 | 12/1987 | Neuman et al. . | |
| 4,752,065 | 6/1988 | Trumbull et al. . | |
| 4,753,596 | 6/1988 | Hart et al. . | |
| 4,798,376 | 1/1989 | Trumbull et al. . | |
| 4,846,686 | 7/1989 | Adams . | |
| 4,856,771 | 8/1989 | Nelson et al. . | |
| 4,868,771 | 9/1989 | Quick et al. . | |
| 4,874,162 | 10/1989 | Trumbull et al. | 472/60 |
| 4,978,299 | 12/1990 | Denne . | |
| 4,993,673 | 2/1991 | Hirose | 248/178 |
| 5,006,072 | 4/1991 | Letovsky et al. | 434/61 |
| 5,018,973 | 5/1991 | Alet et al. . | |
| 5,060,932 | 10/1991 | Yamaguchi . | |
| 5,071,352 | 12/1991 | Denne | 434/29 |
| 5,109,952 | 5/1992 | Starks et al. | 182/69 X |

FOREIGN PATENT DOCUMENTS 2677155   5/1991   France .

Primary Examiner—Ramon O. Ramirez
Assistant Examiner—Korie H. Chan
Attorney, Agent, or Firm—McCormick, Paulding & Huber

[57] ABSTRACT

A motion platform that is displaceable along three axes includes first, second and third carriage assemblies. There is an apparatus connected to each of said carriage assemblies for linearly displacing each of the carriages along a single planar axis. Therefore, the first carriage assembly is linearly displaceable along a first plane, the second carriage assembly is linearly displaceable along a second plane that intersects the first plane, and the third carriage assembly is linearly displaceable along a third plane that intersects at least one of the first and second planes. Each of the carriage assemblies is comprised of a circumferential array of frame members that define a substantially planar parallelogram configuration having a substantially open central portion, with the carriage assemblies being arranged in a nested array.

17 Claims, 4 Drawing Sheets

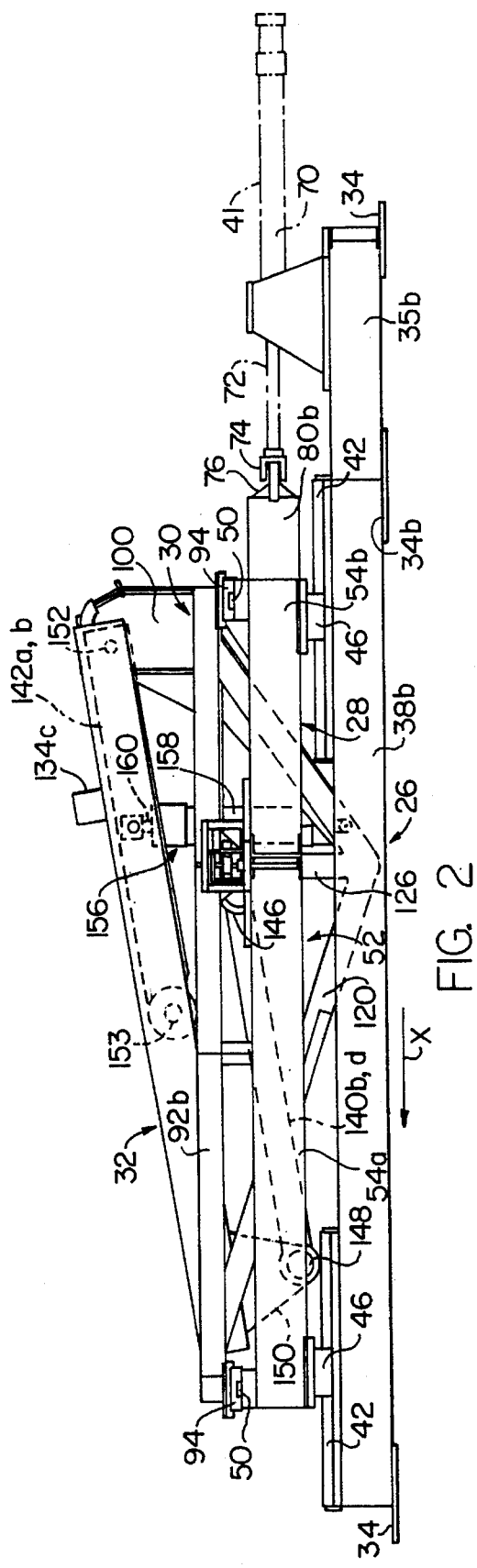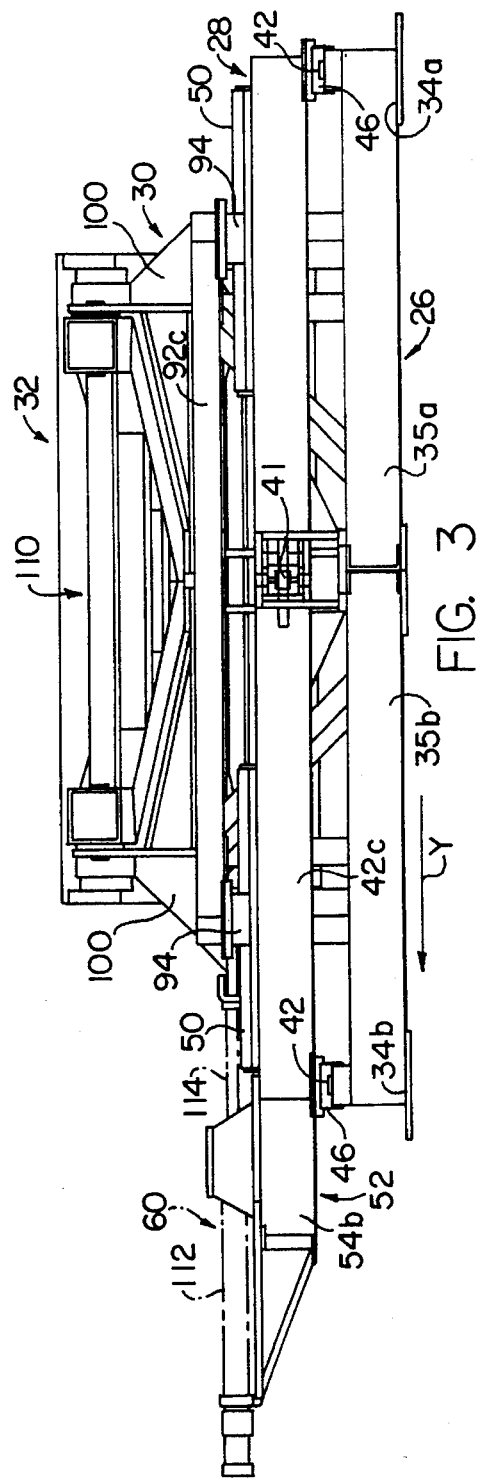

THREE AXIS MOTION PLATFORM

BACKGROUND OF THE INVENTION

1. Field of the Invention

The invention relates generally to platforms for supporting and displacing apparatus along three orthogonal axes, and particularly to platforms that are of compact dimension for use in enclosed or partially enclosed spaces.

Some of the matter contained herein disclosed in U.S. Pat. No. 5,199,875 entitled "A Method and Apparatus for Generating Supplemental Motion in a Simulator" and U.S. patent applications Ser. Nos. 08/014/117, 08/014/330, and 08/271,004 respectively entitled "A Simulator System Having An Orthogonal Motion Base", "A Compact Simulator System Theater" and A Simulator System Having A Suspended Passenger Platform.

2. Description of the Related Art

Motion platforms that are capable of supporting apparatus and providing for displacement of the supported apparatus along three orthogonal axes are commonly utilized in such diverse fields as the assembly of automobiles and printed circuit boards, as well as for simulating flight for commercial and military aircraft simulators. Such platforms are typically rotationally displaceable about their respective axes by hydraulic or pneumatic actuators, depending upon such factors as the weight and size of the load.

However, a disadvantage of such motion platforms is their size, as rotationally displaceable components require considerable space in order to accommodate a full range of rotational displacement along an axis. Moreover, hydraulic actuators, while capable of supporting loads of considerable weight, are prone to leakage of hydraulic fluid. As the hydraulic fluid is typically a non-compressible fluid such as an oil, fluid leakage not only compromises system reliability, but additionally introduces an environmental and safety hazard into the work site. For this reason, special provisions are typically implemented into the site where the motion platforms are installed to collect and drain hydraulic fluid as the fluid leaks from the actuators and to provide for personnel access to the actuator's for their service and repair. As a consequence of the foregoing considerations, motion platforms are typically mounted in open, rather than enclosed or partially enclosed, spaces, as the spatial needs of these platforms has hindered their use in confined spaces.

SUMMARY OF THE INVENTION

A motion platform is provided that is capable of displacement along three orthogonal axes. Displacement along at least one, and preferably all three of the axes, is linear as opposed to rotational.

The motion platform is comprised of a nesting array of carriages. A base frame that is comprised of a circumferential array of frame members is mounted to a floor. An intermediate carriage is mounted to the base frame along linear bearings and is disposed for longitudinal displacement along the x-axis. The intermediate carriage is comprised of a circumferential arrangement of frame members that define a recess. An upper carriage is received within the intermediate carriage recess and is mounted to the intermediate carriage along linear bearings to permit lateral motion of the upper carriage along the x-axis. It is to be appreciated that any bearing structure that is capable of supporting linear motion can be utilized for any of the linear bearings discussed herein. Suitable bearings for use as linear bearings include, by way of non-limiting example, ball bearings, slide bearings, and pivot bearings. A ride car frame is mounted to the upper carriage through a pair of lift arms and stabilizing arms along rotating bearings. Any suitable rotating bearing, such as a roller bearing, needle bearing, or ball bearing, can be utilized for the rotating bearings discussed herein. The lift and stabilizing arms define a parallelogram linkage which controls articulation of the ride frame with respect to the upper carriage along the z-axis. Displacement of the respective carriages and ride frame is implemented by a suitable actuator, such as an hydraulic actuator, pneumatic actuator, or electromagnetic actuator. The respective actuators are independently controllable to provide for independent displacement along the respective x-, y- and z-axes.

BRIEF DESCRIPTION OF THE DRAWINGS

Further features and advantages of the present invention will become apparent from a review of the specification when read in conjunction with the accompanying drawings, in which:

FIG. 2 is a side elevation view of the motion platform of the present invention;

FIG. 3 is a rear elevation view of the motion platform of the present invention;

DETAILED DESCRIPTION OF THE PREFERRED EMBODIMENTS

Figure 1:
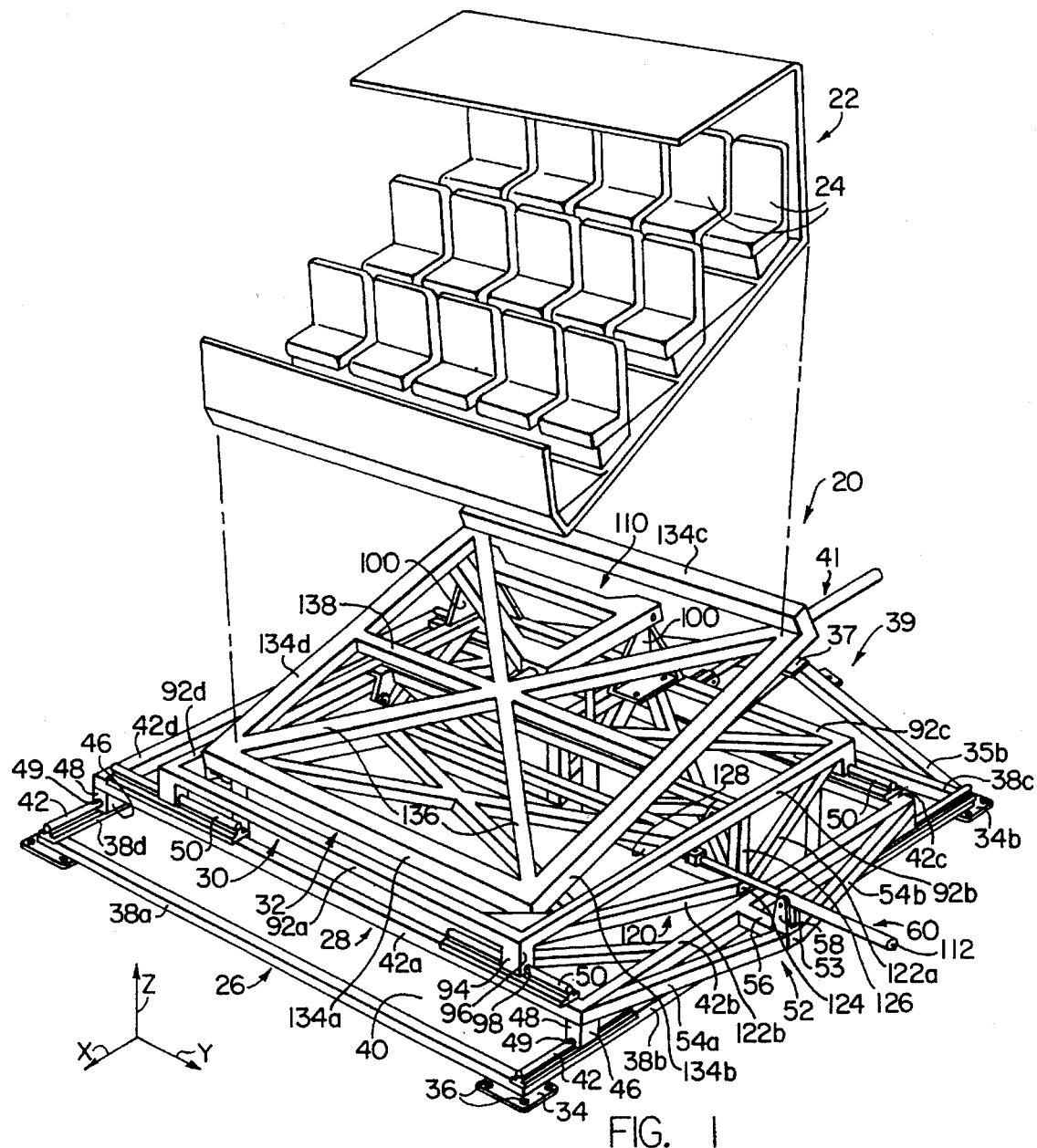
FIG. 1 is perspective view of a motion platform in accordance with the present invention, illustrated in conjunction with a passenger ride car that is supported by the motion frame.

With reference to the drawings, wherein like reference characters represent like components throughout the various views, and with particular reference to FIG. 1, there is depicted a motion platform, which is designated generally by reference character 20, that is adapted to support a ride car, designated generally by reference character 22. The ride car can be of any suitable configuration that includes one or more passenger seats 24.

The motion platform 20 includes a plurality of nesting carriages that allow for the generation of ride car motion along three orthogonal axes in a manner that will be described in detail below. The motion platform is generally comprised of a base frame 26, an intermediate carriage 28 that is supported by the base frame 26, an upper carriage 30 that is supported by the intermediate carriage 28, and a ride car frame 32 that is supported by the upper carriage 30. An upper surface of the ride car frame supports the ride car 22.

Figure 4:
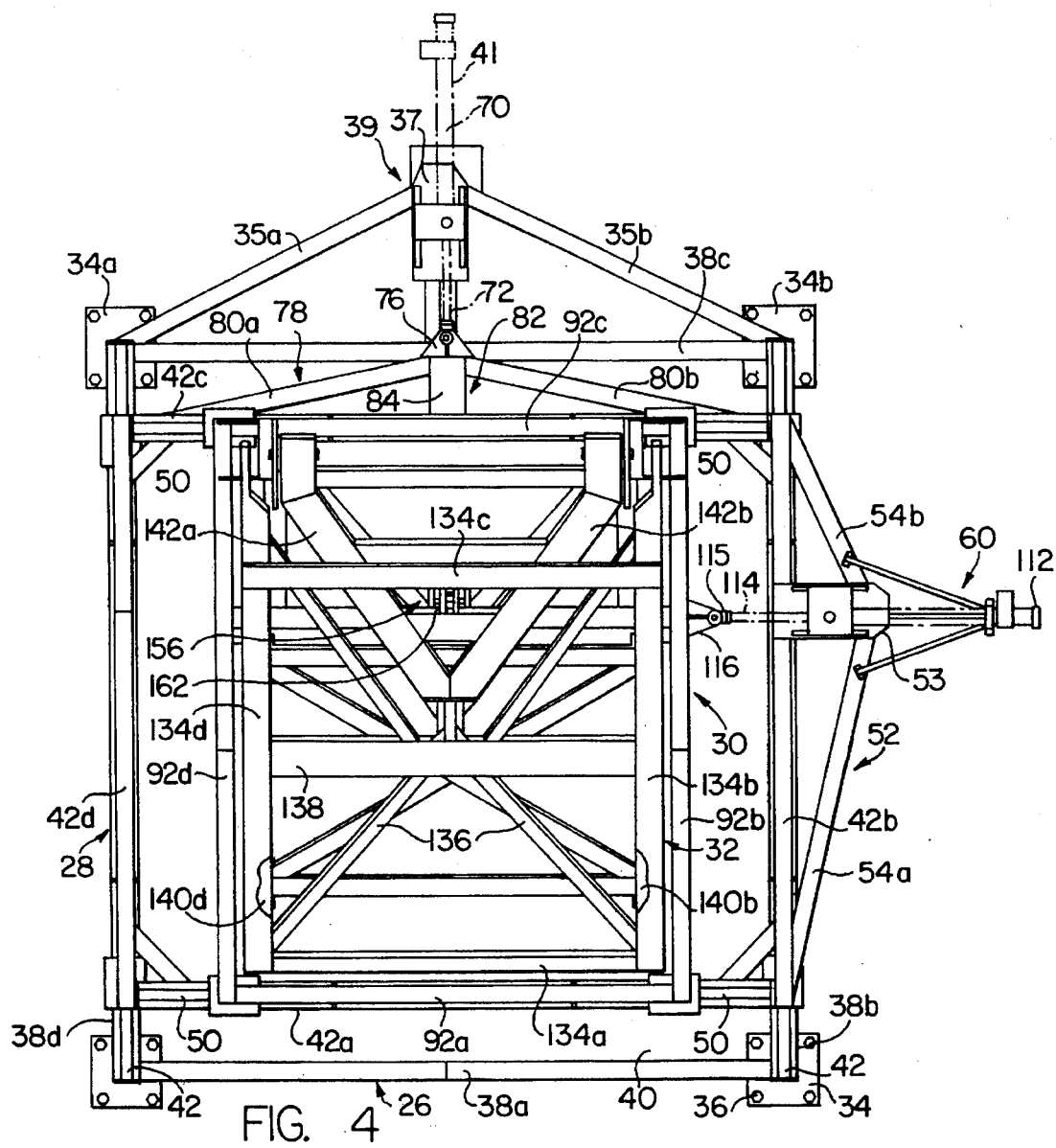
FIG. 4 is a top plan view of the motion platform of the present invention.

The base frame 26 is secured by footings 34 in an appropriate manner, as by bolts 36, to a support surface. The base frame includes a plurality of elongated support beams 38a, 38b, 38c and 38d that are arranged in a planar parallelogram configuration, such as a square or rectangle, so as to define a correspondingly-configured space 40 that is circumscribed by the support beams. Ends of support beams 38*b* and 38*d* are respectively joined in an appropriate manner to corresponding ends of the support beams 38*a* and 38*c*, respectively. A pair of beams 35*a* and 35*b* (FIGS. 1 and 4) extend angularly outwardly from the footings 34*a* and 34*b* to which support beams 38*b*, 38*c* and 38*d* are respectively coupled (FIG. 4). The beams 35*a* and 35*b* are joined at their respective free ends to define the apex 37 of a generally triangular auxiliary base frame assembly 39. The auxiliary base frame assembly 39 supports an actuator assembly 41 that is operable to effect linear displacement fore and aft (i.e., along the x-axis) of the intermediate carriage 28 in the manner described below. A low-friction linear bearing 42 is provided along the upper ends of opposed support beams 38*b* and 38*d* to permit for longitudinal displacement therealong of the intermediate carriage 28 in the manner described below. Suitable linear bearings include ball bearings, slide bearings, and pivot bearings.

The intermediate carriage 28 is formed from a plurality of elongated beams 42*a*, 42*b*, 42*c* and 42*d* that are arranged in a planar parallelogram configuration, such as a square or rectangle, such that ends of opposed beams 42*b* and 42*d* are joined, respectively, to the ends of opposed beams 42*a* and 42*c*, respectively. A flange 46 extends from a lower surface of each end of the beams 42*b* and 42*d* toward the corresponding support beams 38*b* and 38*d* of the base frame 26. The free end 48 of the flange 46 defines a recess or aperture 49 that is configured complementary to the configuration of the linear bearings 42 carried by the base frame support beams 38*b* and 38*d* to permit for sliding engagement of the intermediate carriage 28 with respect to the base frame 26 in the manner described below. A linear bearing 50, such as a ball, slide or pivot or other bearing that is adapted for supporting longitudinal displacement, is provided along an upper surface of the beams 42*a* and 42*c*. As will be described in detail below, the bearings 50 support linear movement of the upper carriage 30 along the intermediate carriage 28.

A supplemental frame assembly, designated generally by reference character 52, extends laterally outwardly from beam 42*b*. The supplemental frame assembly 52 is defined by a pair of elongated, angularly extending beams 54*a* and 54*b* that are connected at one end to beam 42*b* and are joined at the other end so as to form the apex 53 of a generally triangular, planar structure. A support truss 56 extends between the beam 42*b* and the assembly apex 53 to provide reinforcement. A yoke 58 extends upwardly from the assembly apex and truss and provides for pivotable mounting of an actuator 60 that is operable to effect longitudinal displacement of the upper carriage 30 in the manner that will be described below.

The intermediate carriage 28 is displaceable in a fore and aft (X-axis) direction in accordance with operation of the intermediate carriage actuator assembly 41 (FIGS. 2 and 4). The actuator assembly comprises an actuator cylinder 70 that houses a reciprocally extensible arm 72. The free end 74 of the arm 72 is coupled to the intermediate support beam 42*c* through a conventional fitting 76 (FIGS. 1 and 4). Alternatively, the actuator arm 72 can be coupled to the intermediate carriage assembly 28 through an auxiliary carriage frame assembly, designated generally by reference character 78 in FIG. 4, which extends outwardly from the intermediate carriage assembly. The auxiliary carriage frame assembly includes a pair of beams 80*a* and 80*b* that extend angularly toward one another from the beam 42*c* and which join to define the apex 82 of a triangular frame structure. A truss 84 extends between beam 42*c* and the frame apex 82 to provide further reinforcement. Upon extension of cylinder arm 72, the intermediate carriage 28 is displaced forward (i.e., down and to the left in FIG. 1 and to the left in FIG. 2), whereas the intermediate carriage is displaced in the aft direction (i.e., toward the right in FIGS. 1 and 4) upon withdrawal of the cylinder arm 72 into the cylinder 70.

With reference to FIGS. 1–4, the upper carriage 30 is comprised of a plurality of elongated beams 92*a*, 92*b*, 92*c* and 92*d* that are arranged in a planar parallelogram configuration, such as a square or rectangle, such that ends of opposed beams 92*b* and 92*d* are joined, respectively, to ends of opposed beams 92*a* and 92*c*, respectively. A flange 94 extends from a lower surface of each end of the beams 92*a* and 92*c* toward the corresponding intermediate carriage support beams 42*a* and 42*c*, respectively. The free end 96 of each flange 94 defines an aperture or recess 98 that is configured complimentary to the configuration of the intermediate carriage linear bearing 50 to permit for sliding engagement of the upper carriage 30 with respect to the intermediate carriage 28 in the manner described below. A pair of upstanding, laterally spaced brackets 100 (FIGS. 1, 2 and 5) supports a parallelogram linkage, denoted generally by reference character 110 (FIGS. 1 and 5) that provides for vertical (i.e., z-axis) displacement of the ride car frame 32 in the manner described below.

Figure 5:
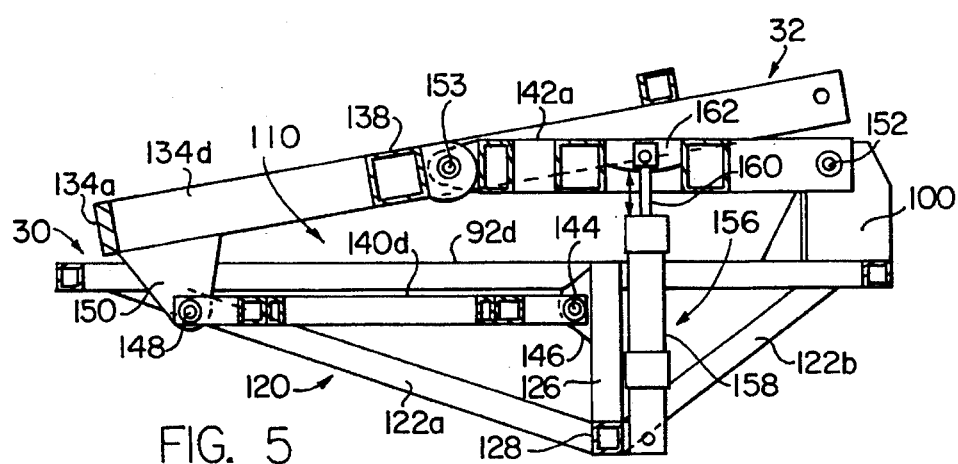
FIG. 5 is schematic side elevation view of the platform lift assembly of the present invention.
Figure 6:
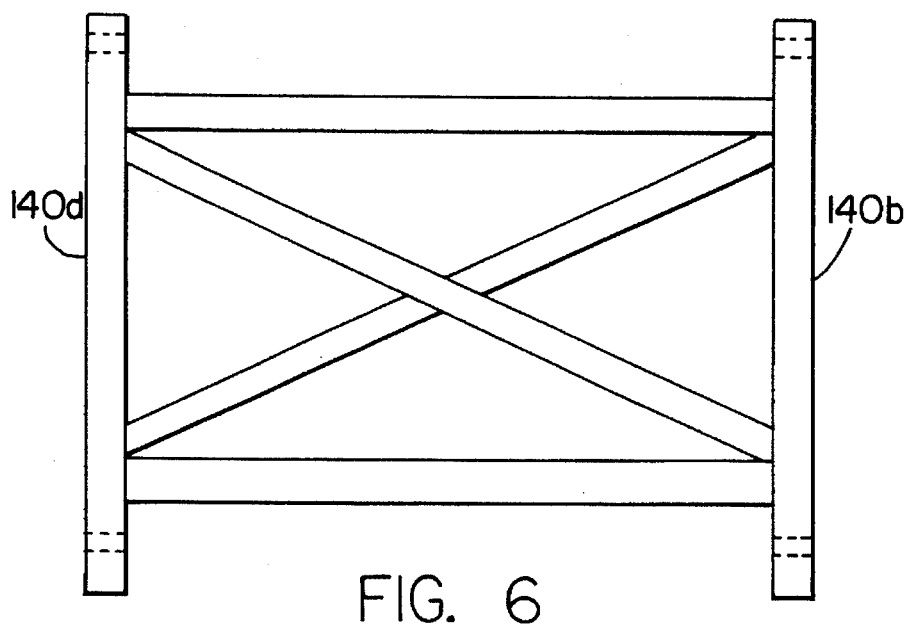
FIG. 6 is a simplified schematic illustration of stabilizing arms utilized in the embodiment of the present invention shown in FIG. 1.
Figure 7:
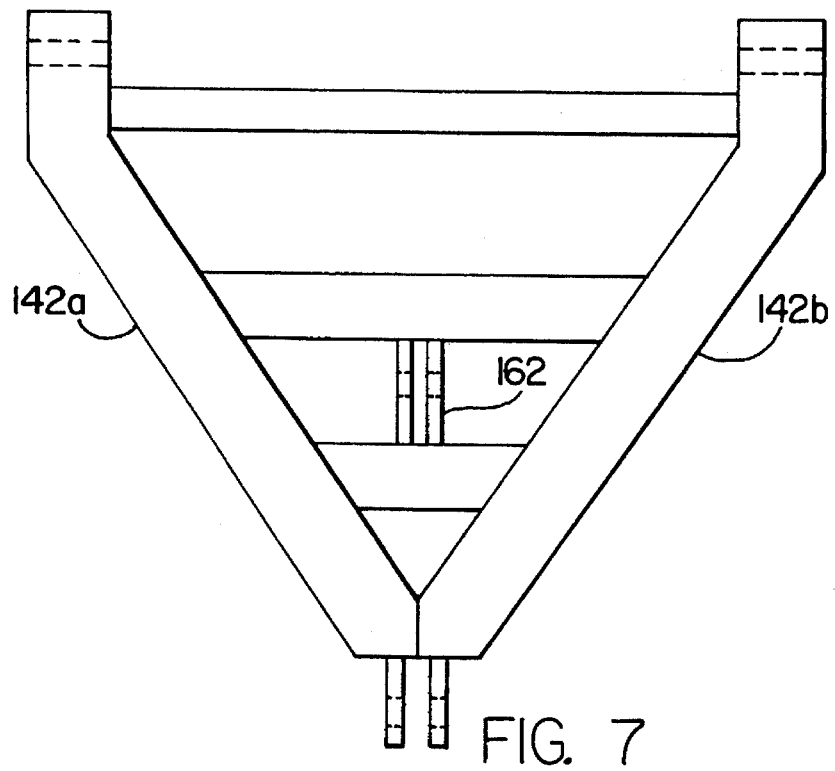
FIG. 7 is a simplified schematic illustration of lifting arms utilized in the embodiment of the present invention shown in FIG. 1.

The upper carriage is laterally displaceable (i.e., displaceable to the left and right in FIGS. 1 and 3) in accordance with the operation of the actuator assembly 60 identified above. The lateral actuator assembly 60 includes a cylinder 112 and an actuator arm 114 that is reciprocally extensible from the cylinder 112. The free end 115 of the actuator arm 114 is coupled to a connector bracket 116, which connects the actuator arm 114 to an upper carriage subframe, denoted generally by reference character 120. A subframe 120 can be provided along the left and right sides of the upper carriage so as to extend from the beams 92*b* and 92*d*, respectively. Each of the subframes 120 is comprised of a pair of beams 122*a* and 122*b* that extend angularly outwardly from the beams 92*b* and 92*d* and join at one end thereof to define the apex 124 of a generally triangular structure. Reinforcement is provided for each subframe 120 by a vertically oriented truss 126 that extends from the beam 92*b* and 92*d*, respectively, to the subframe apex 124. The subframe apices 124 are connected by a reinforcement beam 128 to further augment structural integrity of the upper carriage and to support the parallelogram linkage 110 referenced above (FIG. 5).

With reference to FIGS. 1 and 3, the ride car frame 32 is comprised of a plurality of elongated beams 134*a*, 134*b*, 134*c* and 134*d* that are arranged in a planar parallelogram configuration, such as a square or rectangle, such that ends of opposed beams 134*b* and 134*d* are joined, respectively, to the ends of opposed beams 134*a* and 134*c*. Reinforcement is provided by diagonal bracing members 136 that extend across the space defined by the beams 134*a*–134*d* to join diagonally opposed corners of the parallelogram. Further reinforcement is provided by a lateral bracing member 138 that extends across the space defined by beams 134*a*–134*d* to join opposed beams 134*b* and 134*d*.

The ride car frame is supported by the parallelogram linkage 110 identified previously. With reference to FIGS. 2, 4 the linkage 110 is comprised of a pair of laterally spaced stabilizing arms 140*b* and 140*d*, and a pair of laterally spaced lifting arms 142*a* and 142*b*. A back end of each stabilizing arm 140*b* and 140*d* is mounted to the upper carriage adjacent the support beams 92*b* and 92*d* or another suitable location by a rotating bearing 144 that is received within a bearing mount 146 that is coupled to the upper carriage. A forward end of each stabilizing arm 140b and 140d is connected to a forward end of the ride car frame 32 by a rotating bearing 148 that is received within a bearing mount 150. The back end of each lifting arm 142a and 142b is mounted to a corresponding one of the vertically upstanding carriage brackets 100 by a rotating bearing 152. The front end of each lifting arm 142a and 142b is mounted to the underside of the ride car frame 32 along the lateral bracing member 138 or other suitable location by a rotating bearing 153 that is received within a suitable bearing mount. The stabilizing arms 140b and 140d and lifting arms 142a and 142b are formed of equal length so as to maintain a parallel relationship through vertical displacement of the ride car frame 32.

Vertical (z-axis) displacement of the ride car is accomplished through cooperation of a vertical actuator assembly, denoted generally by reference character 156 (FIGS. 1, 2 and 5), and the parallelogram linkage 110 described previously. The vertical actuator assembly 156 comprises an actuator cylinder 158 which is disposed to receive therein a reciprocally extensible actuator arm 160. The free or outer end of the actuator arm 160 is connected to the lifting arms 142a and 142b through a brace 162 (FIG. 4), which is portioned at a point intermediate the longitudinal length of the lifting arms. Connection to the lifting arms 142a and 142b in this manner produces a 2:1 mechanical disadvantage in the connection of the vertical actuator assembly 156 to the lifting arms, resulting in a diminuation by 50% of the actuator arm stroke that is necessary to obtain a desired range of ride car vertical displacement. Moreover, the angular inclination or "pitch" of the ride car from the rear toward the front is maintained constant throughout the stroke of the actuator arm 160 as the ride car frame is advanced along an arcuate path throughout the stroke. The foregoing arrangement is advantageous, for it affords a shorter actuator arm stroke length and a lower, more compact assembly. Inclination of the ride car frame at an angle of from about 5° to about 15° also permits a lower profile ride car and facilitates seat raking (i.e., steepness of adjacent seat rows) within the ride car, thereby minimizing viewer interference from other viewers seated in more forward rows of seats.

Operation of the Three-Axis Motion Platform

As the components of the three-axis motion platform have now been identified, operation of these components within the system will now be described.

As has been mentioned previously, the motion platform is capable of selectively generating linear motion along three orthogonal axes: lateral (y-axis), fore and aft (x-axis) and vertical (z-axis). Displacement along each of the respective axes is independently controllable of displacement along the other axes. Control can be input to the respective displacement actuator assemblies 60 (y-axis), 41 (x-axis) and 156 (z-axis) manually through appropriate control input from one or more control stations, or, more preferably, from an automated control system such as a computer that is operable to generate control input signals to the respective actuators in accordance with a multi-axis motion program. Such multi-axis action programs can be employed in component manufacturing to facilitate the assemblage of elements, as well as in the simulation of vehicle flight or other motion, as can occur in the instances of amusement rides and the simulation of land-, sea- and air-borne vehicles.

Lateral displacement (i.e., displacement to the left or right in FIG. 1) is accomplished upon operation of actuation cylinder assembly 60. Displacement to the left in the drawing is accomplished upon extension of the actuator arm 114. As the actuator arm 114 is connected to the upper carriage assembly 30 through mounting bracket 116, outward extension of the actuator arm urges the upper carriage assembly 30 away from the actuator cylinder 112, causing the carriage assembly 30 to slide along bearings 50 that are mounted along an upper surface of the intermediate carriage 28. Displacement of the motion platform to the right is accomplished by retracting the actuator cylinder 114 within the actuator cylinder 112, thereby drawing the upper carriage 30 along bearings 50 toward the right side of the drawing.

Fore and aft displacement is accomplished by cooperation of the actuator assembly 41 and the intermediate carriage assembly 28. Forward displacement of the motion platform is accomplished upon extension of actuator arm 72 from actuator cylinder 70. As the actuator arm 72 is connected to the intermediate carriage assembly 28, extension of the actuator arm 72 urges the carriage assembly 28 away from the cylinder 70, along linear bearings 42 that are mounted to an upper surface of the base frame 26. Rearward, or aft, displacement of the motion platform is accomplished by retracting the actuator arm 72 within the cylinder 70, thereby drawing the intermediate carriage assembly 28 toward the cylinder 70 by sliding the carriage assembly 28 along the linear bearings 42.

Vertical displacement of the motion platform is accomplished by the vertical actuator assembly 156. The base of the actuator assembly is coupled to the upper carriage subframe 120. Extension of cylinder arm 160 urges the lifting arms 142a and 142b to pivot about rotating bearing 152, thereby causing pivotal displacement of stabilizing arms 140b and 140d along rotating bearing 144. As the stabilizing and lifting arms are mounted to the upper carriage assembly 30 and are of equal length, they maintain a parallel relationship throughout the stroke of cylinder arm 160 as the ride car frame 32 is raised and lowered. Because the stabilizing and lifting arms are fixedly mounted to the upper carriage assembly 30 along brackets 100 and 146, the ride car frame 32 is advanced along an arcuate path as it is raised and lowered by the vertical actuator assembly 156. As a result of the foregoing arrangement, displacement along the x-, y- and z-axes can be accomplished in a motion platform that is of compact dimension due to the provision of linear, as opposed to rotational, modes of displacement and by the arrangement of an array of nesting carriages and frame assemblies.

While the invention has been described in connection with preferred embodiments, it is to be appreciated and understood that departures therefrom are nevertheless intended to fall within the purview and scope of the accompanying claims. It is to be further appreciated and understood that substitutions of one form of component for another form specified in the patent specification is also explicitly contemplated. For example, substitution of various forms of linear bearings that accomplish the same objectives of the linear bearings disclosed herein is expressly contemplated by the present invention. The same holds true for the substitution of various forms of rotating bearings for the rotating bearings recited in the specification. Moreover, substitution of one form of actuator, such as an hydraulic, pneumatic or electromagnetic actuator for an actuator of another type specified in the foregoing specification is also expressly contemplated. Further, a combination of different types of actuators, such as pneumatic and electromagnetic, or electromagnetic and hydraulic, for implementing motion along different axes in the manner specified above, is expressly contemplated by this disclosure.

What is claimed is:

1. A motion platform that is displaceable along three axes comprising first, second and third carriage assemblies and means connected to each of said carriage assemblies for linearly displacing each of said carriages along a single planar axis, whereby said first carriage assembly is linearly displaceable along a first plane, said second carriage assembly is linearly displaceable along a second plane that intersects said first plane, and said third carriage assembly is linearly displaceable along a third plane that intersects at least one of said first and second planes wherein each of said carriage assemblies is comprised of a circumferential array of frame members that define a substantially planar parallelogram configuration having a substantially open central portion, said carriage assemblies being arranged in a nested array.

2. The motion platform according to claim 1, wherein said linear displacement means comprises a reduced friction bearing surface that is interposed between adjacent nested carriage assemblies.

3. The motion platform according to claim 2, wherein said linear displacement means comprises an actuator assembly having an arm reciprocally extensible within an actuator housing, said arm having a free end that is connected to one of said carriage assemblies, whereby reciprocal extension of said arm effectuates slidable displacement of said carriage assembly connected to said arm free end along one of said planes.

4. The motion platform according to claim 1, wherein said linear displacement means comprises a plurality of actuator assemblies connected to said carriage assemblies and operable to effect linear displacement of said carriage assemblies along planes that are oriented substantially orthogonal to one another.

5. The motion platform according to claim 4, wherein said plurality of actuators are arranged such that at least one actuator is connected to each of said carriage assemblies, each of said actuator assemblies having an arm that is reciprocally extensible with respect to an actuator housing, said arm having a free end connected to a corresponding one of said carriage assemblies such that, with respect to at least one carriage assembly, reciprocal extension of one arm effectuates slidable displacement of said carriage assembly connected thereto relative to another of said carriage assemblies.

6. The motion platform according to claim 5, wherein said slidable displacement is achieved by interposition of a linear bearing between said carriage assemblies.

7. The motion platform according to claim 1, wherein one of said linear displacement means comprises a parallelogram linkage that connects one of said carriage assemblies to another of said carriage assemblies, said linkage being pivotably connectable to said carriage assemblies and being connected to said linear displacement means so as to maintain the spatial relationship between said interconnected carriage assemblies throughout pivotable displacement of said parallelogram linkage.

8. The motion platform according to claim 7, wherein said parallelogram linkage comprises a stabilizing arm and a lifting arm, a forward end of each of said arms being pivotably connected to one of said carriage assemblies and a back end of each of said arms being pivotably connected to another of said carriage assemblies.

9. The motion platform according to claim 8, wherein said linear displacement means further comprises an actuator assembly comprising an actuator arm that is reciprocally extensible with respect to an actuator housing, a free end of said actuator arm being connected to said lifting arm so as to effect displacement of said lifting arm along a predetermined range of motion.

10. The motion platform according to claim 9, wherein said forward end of said lifting arm is connected near the midline of said carriage assembly and the free end of said actuator arm is connected near the midline of said lifting arm.

11. The motion platform according to claim 1 wherein said carriage displacing means is connected to said carriage assemblies so as to subject said carriage assemblies to substantially similar motion cues.

12. The motion platform according to claim 11, wherein said linear displacement means comprises an actuator assembly having an arm reciprocally extensible within an actuator housing, said arm having a free end that is connected to one of said carriage assemblies, whereby reciprocal extension of said arm effectuates slidable displacement of said carriage assembly connected to said arm free end along one of said planes.

13. The motion platform according to claim 11, wherein one of said linear displacement means comprises a parallelogram linkage that connects one of said carriage assemblies to another of said carriage assemblies, said linkage being pivotably connectable to said carriage assemblies and being connected to said linear displacement means so as to maintain the spatial relationship between said interconnected carriage assemblies throughout pivotable displacement of said parallelogram linkage.

14. The motion platform according to claim 13, wherein said parallelogram linkage comprises a stabilizing arm and a lifting arm, a forward end of each of said arms being pivotably connected to one of said carriage assemblies and a back end of each of said arms being pivotably connected to another of said carriage assemblies.

15. The motion platform according to claim 14, wherein said linear displacement means further comprises an actuator assembly comprising an actuator arm that is reciprocally extensible with respect to an actuator housing, a free end of said actuator arm being connected to said lifting arm so as to effect displacement of said lifting arm along a predetermined range of motion.

16. The motion platform according to claim 15, wherein said forward end of said lifting arm is connected near the midline of said carriage assembly and the free end of said actuator arm is connected near the midline of said lifting arm.

17. The motion platform according to claim 11, wherein at least one of said carriage assemblies has a back end and a forward end, said back end being angularly inclined toward said forward end.

* * * * *

UNITED STATES PATENT AND TRADEMARK OFFICE
CERTIFICATE OF CORRECTION

PATENT NO. : 5,509,631
DATED : April 23, 1996
INVENTOR(S) : Thomas DeSalvo

It is certified that error appears in the above-indentified patent and that said Letters Patent is hereby corrected as shown below:

Col. 1, line 65, delete "x-axis" and substitute --y-axis--.

Col. 4, line 62, after "4" add --,5, 6 and 7--

Signed and Sealed this

Thirteenth Day of August, 1996

*Attest:*

BRUCE LEHMAN

*Attesting Officer*     *Commissioner of Patents and Trademarks*